May 29, 1956
R. T. BARNES ET AL
2,747,366
STARTING SYSTEM FOR RAMJETS
Filed April 13, 1953
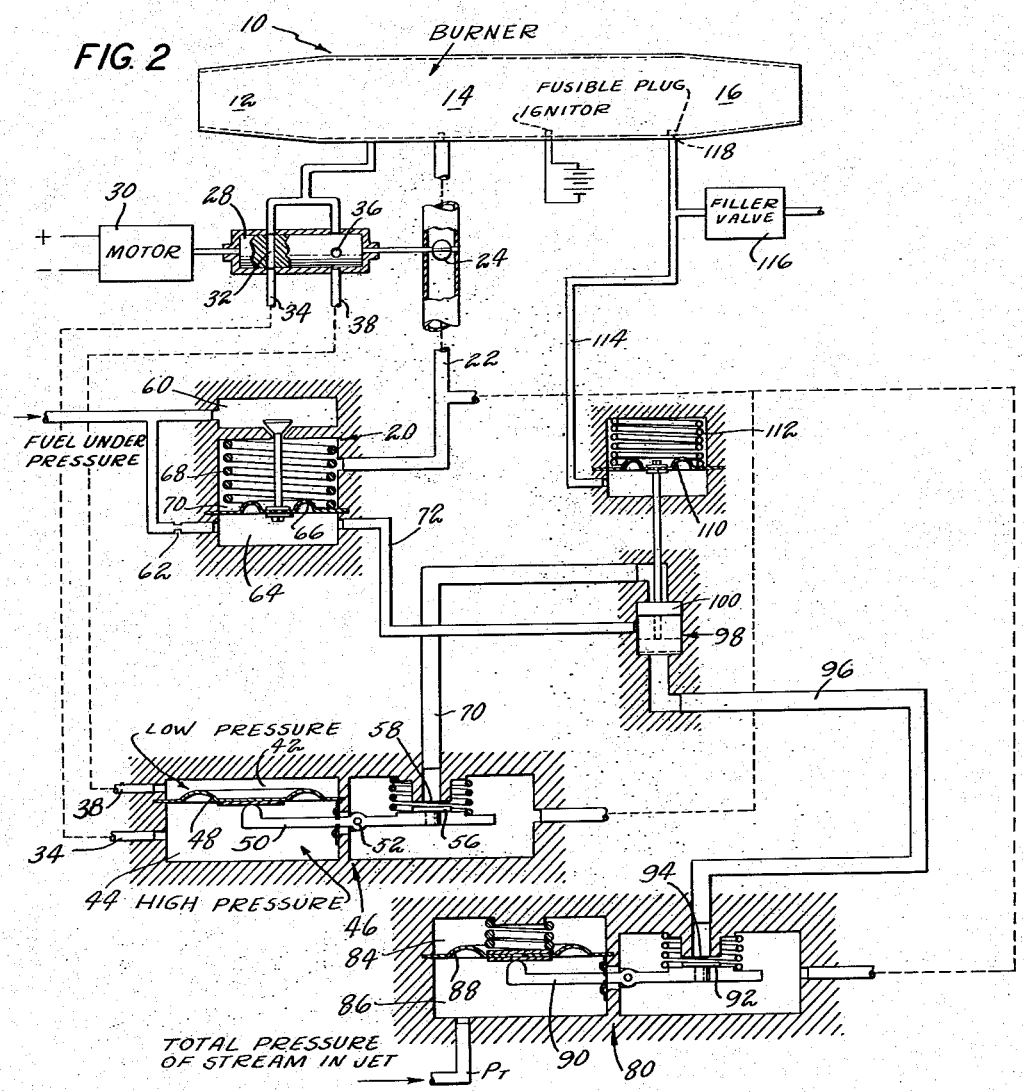
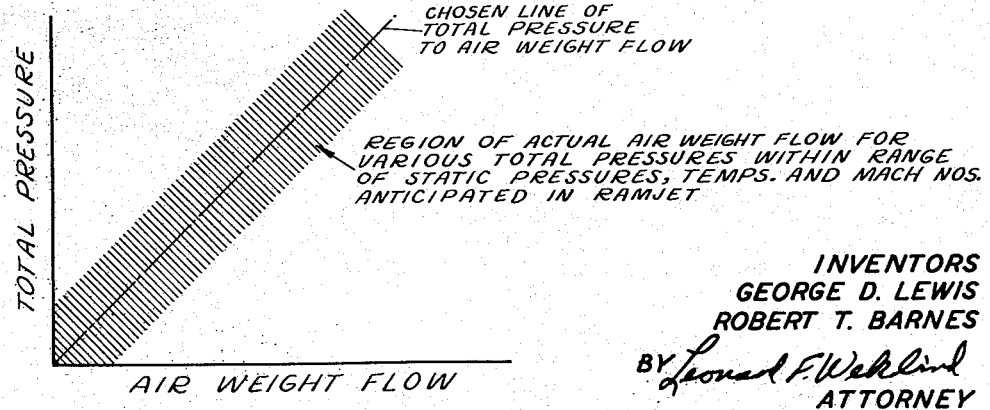
INVENTORS
GEORGE D. LEWIS
ROBERT T. BARNES
BY Leonard F. Wakelind
ATTORNEY

United States Patent Office 2,747,366
Patented May 29, 1956

2,747,366
STARTING SYSTEM FOR RAMJETS

Robert T. Barnes, Saratoga Springs, N. Y., and George D. Lewis, Manchester, Conn., assignors to United Aircraft Corporation, East Hartford, Conn., a corporation of Delaware Application April 13, 1953, Serial No. 348,412

15 Claims. (Cl. 60—39.14)

This invention relates to fuel regulators for power plants such as a ramjet and more particularly to a starting system for such power plants.

It is an object of this invention to provide a fuel regulator for a ramjet including a separate regulator for starting the ramjet and means for switching from the starting system to the normal regulating system upon a predetermined increase in temperature in the power plant.

It is a further object of this invention to provide a starting regulating system for a ramjet power plant which responds to the total pressure of the airstream in the power plant for regulating fuel flow including mechanism for cutting out the starting system when combustion in the burner of the power plant is obtained.

These and other objects of this invention will become readily apparent from the following detail description of the drawings in which:

Fig. 1 is a diagrammatical illustration of the air weight flow in a ramjet power plant as compared to the total pressure therein; and Fig. 2 is a schematic illustration of a fuel regulator including a starting system according to this invention.

In ramjet fuel regulators which depend on pressures created in the combustion chamber for controlling the fuel flow, it is necessary to provide some form of regulation prior to the time that sufficient combustion is obtained and adequate controlling pressures established. A ramjet missile, for example, will normally be accelerated by some booster until sufficient flight speed is obtained for proper operation of the ramjet power plant. After the booster has expended its energy there is a very short time allowed for obtaining adequate combustion in the power plant so that it is important to provide a fuel flow rate which will provide a burnable fuel air mixture before ignition occurs.

Although the air weight flow through a ramjet is not directly proportional to the total pressure of that air flow, for a limited temperature range, Mach number range, and static pressure range, the air weight flow will be within a certain percentage of a line directly proportional to the total pressure. This is more clearly illustrated in Fig. 1. Thus, if the total pressure is assumed as a measure of air weight flow, it accordingly can be used to set the fuel flow to provide an arbitrary fuel-air ratio near the middle of the fuel-air range for the ramjet, which fuel flow will create an actual fuel-air ratio that is within the limits necessary for combustion. The following describes a starting system incorporated within a regulating system and utilizing the foregoing principle.

Referring to Fig. 2, a ramjet power plant 10 is illustrated as having an inlet and diffuser section 12, a burner section 14 and an exhaust nozzle 16. The ramjet 10 may, of course, in itself be the vehicle being propelled. Normal regulation of the fuel flow during power plant operation is based on a pulsating type fuel control substantially similar to that described in copending patent application Serial No. 219,344, filed April 5, 1951, by Charles K. Leeper.

To this end then a main throttle valve 20 is provided which controls the flow of fuel into the line 22 leading to the burner section of the ramjet. A pulsating throttle valve 24 is provided in the line 22 to systematically vary the fuel flow flowing into the burner 14. These systematic variations of fuel flow will cause a pulsating pressure to exist in the burner 14 and these pressures are sensed by a pick-off valve 28. Both the pick-off valve 28 and the throttle valve 24 are rotated by a motor 30 at a predetermined rate. The pick-off valve 28 and the pulsating throttle 24 are arranged so that when the high pressure is reached during each pulsation, the valve passage 32 connects the high pressure line 34 to the combustion chamber and when the low pressure is reached, the valve passage 36 connects the low pressure line 38 to the combustion chamber. The high and low pressure lines 34 and 38 lead to high and low pressure chambers 44 and 42, respectively, of the normal pressure regulator 46. These pressures react on the diaphragm 48 which in turn moves the control lever 50 about its pivot 52. The opposite end of the lever 50 includes a valve element 56 which regulates the opening of the passage 58. During normal regulation of the fuel flow, fuel under pressure is fed to chamber 60 of the main throttle valve 20. This fuel is also fed through an orifice 62 to the chamber 64 so that the fuel pressure reacts on the diaphragm 66 against the spring 68 and the fuel pressure in the chamber 70.

Therefore, it will be apparent that the normal regulator 46 will vary the opening 58 at the right hand side of the control lever 50 thereby varying the pressure in the line 70 and also line 72 and chamber 64 in the lower portion of the main throttle valve. Variation of the pressure in chamber 64 then varies the opening of the throttle valve.

Thus when operating on the lean side of the pressure versus fuel-air ratio curve each fuel increase pulsation of the pulsating throttle valve 24 will cause an increase in pressure thereby causing an increase in average pressure tending to open the throttle valve 20 while the reverse will be true when operating on the rich side of said curve. Hence, generally the fuel control will tend to maintain maximum burner pressure regardless of the weight of air flow and hence maximum thrust. By particular adjustment of the mechanism it may be desirable to operate at other than the maximum pressure point on the pressure versus fuel-air ratio curve. The foregoing principles are set forth in more detail and claimed in the above-referred to copending application.

As mentioned above, it is desirable to have the throttle valve 20 set so as to provide sufficient fuel flow to start combustion. To this end a starting regulator valve 80 is provided which regulator is similar to the regulator 46. Thus, an upper evacuated chamber 84 is provided as well as a lower chamber 86 which is exposed to the total pressure of the airstream in the ramjet. The pressure in the chamber 86 reacts against the diaphragm 88 so as to vary the position of the lever 90 which at its right hand side has a valve element 92 which varies the opening 94.

During starting the regulator 80 is connected via a line 96 through a valve 98 to the line 72 and the chamber 64 in the lower part of the main throttle valve 20. The valve 98 includes a piston 100 which assumes the full line position indicated during starting. In this position of the piston 100 the line 70 leading from the main regulator 46 is cut off from communication with the line 72 and chamber 64 of the throttle valve while the starting regulator 80 has its line 96 in communication with the line 72 and chamber 64.

During starting the piston 100 is held on the full line position by a diaphragm 110 which is acted upon on its bottom side by fluid pressure sufficient to overcome the spring 112. The bottom side of the diaphragm 110 is operatively connected to a line 114 which is filled by a suitable filler valve 116 with fluid under sufficient pressure to overcome the aforementioned spring 112. The line 114 is also connected to a suitable point in the power plant and includes a fusible plug 118 at the power plant. Thus, it will be apparent that by selecting the characteristics of fusible plug 118 once combustion has taken place, temperature will rise sufficiently to melt the fusible plug and vent the line 114. This will cause the diaphragm 110 to be moved downwardly so that the piston 100 of the valve 98 assumes the dotted line position illustrated. In this position of the piston 100 the starting regulator 80 is cut off from the main throttle valve and the normal regulator 46 is automatically connected to the throttle valve so as to control the latter in the manner described above. It will be apparent that the melting of the plug 118, the venting of line 114 and the movement of piston 100 operates as a trigger device whereby potential energy in spring 112 is released. Thus any type of well known mechanical trigger device may be used in connection with a temperature responsive release element. The term trigger device is used since the mechanism as shown would have to be reset by replacing the fusible plug and introducing high pressure fluid into line 114 through valve 116.

In view of the foregoing it is readily apparent that a simple yet accurate means has been provided to permit starting of ramjet power plants where burner pressure is relied upon to normally control the fuel flow to the power plant.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a power plant having a combustion chamber, a source of fuel under pressure, regulator means operatively connected to said combustion chamber and said source for controlling the flow of fuel to the combustion chamber, said regulator means including a first means responsive to the pressure in said combustion chamber during operation, said regulator means including a throttle valve, and secondary means operatively connected to said regulator means for opening said throttle during starting of the power plant independently of said first means.

2. In a power plant having a combustion chamber, a source of fuel under pressure, regulator means operatively connected to said combustion chamber and said source for controlling the flow of fuel to the combustion chamber, said regulator means including a first means responsive to the pressure in said combustion chamber during operation, said regulator means including a throttle valve, secondary means operatively connected to said regulator means for opening said throttle during starting of the power plant independently of said first means, and means for disabling said secondary means.

3. In a ramjet power plant having a combustion chamber, a source of fuel under pressure, regulator means operatively connected to the combustion chamber and said source for controlling the flow of fuel to the combustion chamber, including a main throttle valve, said regulator means being responsive to the pressures in said combustion chamber, and a second regulator means operatively connected to said source and combustion chamber for regulating the fuel flow during starting of the power plant, including operative connections to said throttle valve, said second means comprising a flow control valve responsive to the total pressure in the combustion chamber.

4. In a ramjet power plant having a combustion chamber, a source of fuel under pressure, regulator means operatively connected to the combustion chamber and said source for controlling the flow of fuel to the combustion chamber including a throttle valve, said regulator means being responsive to the static pressures in said combustion chamber, and a second regulator means operatively connected to said source and combustion chamber for regulating the fuel flow during starting of the power plant, including operative connections to said throttle valve, said second means comprising a flow control valve responsive to the total pressure in the combustion chamber.

5. In a ramjet power plant having a combustion chamber, a source of fuel under pressure, regulator means operatively connected to the combustion chamber and said source for controlling the flow of fuel to the combustion chamber, said regulator means being responsive to the pressures in said combustion chamber, and a second regulator means operatively connected to said source and combustion chamber for regulating the fuel flow during starting of the power plant, comprising a flow control valve responsive to the total pressure in the combustion chamber, and means for switching from said second regulator means to said regulator means.

6. In a ramjet power plant having a combustion chamber, a source of fuel under pressure, regulator means operatively connected to the combustion chamber and said source for controlling the flow of fuel to the combustion chamber, said regulator means being responsive to the pressures in said combustion chamber, and a second regulator means operatively connected to said source and combustion chamber for regulating the fuel flow during starting of the power plant, comprising a flow control valve responsive to the total pressure in the combustion chamber, and means for switching from said second regulator means to said regulator means, said switching means being responsive to an increase in temperature in said combustion chamber.

7. In a ramjet power plant having a combustion chamber, a source of fuel under pressure, regulator means operatively connected to said combustion chamber and said source for controlling the flow of fuel to the combustion chamber, said regulator means including a throttle valve and a first means responsive to the pressure in said combustion chamber during operation, said first means controlling said throttle valve, secondary means for controlling said throttle valve during starting of the power plant independently of said first means, and means for switching from control by said secondary means to control by said first means comprising a device responsive to a predetermined temperature in said combustion chamber.

8. In a ramjet power plant having a combustion chamber, a source of fuel under pressure, regulator means operatively connected to said combustion chamber and said source for controlling the flow of fuel to the combustion chamber, said regulator means including a throttle valve and a first means responsive to the pressure in said combustion chamber during operation, said first means controlling said throttle valve, secondary means for controlling said throttle valve during starting of the power plant independently of said first means, means for preselectively operatively connecting said secondary means to said throttle valve for controlling the latter, and means for automatically disconnecting said secondary means from said throttle valve and operatively connecting said first means thereto for controlling the valve including a device responsive to a parameter of power plant operation.

9. In a power plant having a combustion chamber, a source of fuel under pressure, regulator means operatively connected to said combustion chamber and said source for controlling the flow of fuel to the combustion chamber including a throttle valve, a first means responsive to a parameter of power plant operation for controlling said throttle valve, secondary means operatively connected to said regulator means for opening said throttle during starting of the power plant independently of said first means, means for disconnecting said secondary means from said throttle including a biasing device, and means responsive to a second parameter of power plant operation for disabling said biasing device.

10. In a power plant according to claim 9 wherein said biasing device comprises a chamber containing fluid under pressure operatively connected to said secondary means, and said disabling device includes mechanism for venting said chamber.

11. In a power plant having a combustion chamber, a source of fuel under pressure, regulator means operatively connected to said combustion chamber and said source for controlling the flow of fuel to the combustion chamber, said regulator means including a first means responsive to the pressure in said combustion chamber during operation and including a throttle valve, secondary means operatively connected to said regulator means for opening said throttle during starting of the power plant independently of said first means, and means for disabling said secondary means, said disabling means comprising temperature responsive mechanism operatively connected to said combustion chamber.

12. In a power plant according to claim 11 wherein said disabling means includes a trigger mechanism and a fusible plug operatively connected to said trigger mechanism and exposed to the gases in said combustion chamber for operating said trigger mechanism.

13. In a power plant according to claim 12 including a chamber containing fluid under pressure and operatively connected to said trigger mechanism, and means connecting said chamber to said fusible plug.

14. In a ramjet power plant having a combustion chamber, a source of fuel under pressure, regulator means for controlling the flow of fuel to the combustion chamber including a throttle valve, a first means responsive to a parameter of power plant operation for controlling regulator means, and secondary means operatively connected to said regulator means for controlling said regulator means during starting of the power plant independently of said first means.

15. In a ramjet power plant having a combustion chamber, a source of fuel under pressure, regulator means for controlling the flow of fuel to the combustion chamber including a throttle valve, a first means responsive to a parameter of power plant operation for controlling regulator means, secondary means operatively connected to said regulator means for controlling said regulator means during starting of the power plant independently of said first means, and a device operatively connected to said first and secondary means for disconnecting one of said means from and connecting the other of said means to said regulator means including mechanism responsive to a second parameter of power plant operation.

References Cited in the file of this patent

UNITED STATES PATENTS

| | | |
|---|---|---|
| 2,596,815 | Keil | May 13, 1952 |
| 2,688,845 | Ostroff | Sept. 14, 1954 |